(12) United States Patent
Wainfan et al.

(10) Patent No.: US 6,339,707 B1
(45) Date of Patent: Jan. 15, 2002

(54) METHOD AND SYSTEM FOR PROVIDING WIDEBAND COMMUNICATIONS TO MOBILE USERS IN A SATELLITE-BASED NETWORK

(75) Inventors: S. Lynne Wainfan, Long Beach; Ellen K. Wesel, Santa Monica; Michael S. Pavloff, Redondo Beach; Arthur W. Wang, Cypress, all of CA (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/395,903

(22) Filed: Sep. 14, 1999

Related U.S. Application Data

(62) Division of application No. 08/867,197, filed on Jun. 2, 1997.

(51) Int. Cl.[7] .................................................. H04Q 7/20
(52) U.S. Cl. ..................... 455/427; 455/12.1; 455/13.3; 455/429
(58) Field of Search ................................. 455/12.1, 13.1, 455/427, 450, 575, 447, 63, 13.4, 3.2, 443, 432, 428, 430, 429; 244/171, 164, 165; 370/338, 79, 80, 50, 94.1, 95.1, 316–326; 342/352–355

(56) References Cited

U.S. PATENT DOCUMENTS

| | | | | |
|---|---|---|---|---|
| 4,691,882 A | * | 9/1987 | Young ........................ | 455/13.1 |
| 5,008,952 A | | 4/1991 | Davis et al. | |
| 5,129,095 A | * | 7/1992 | Davis et al. ................ | 455/12.1 |
| 5,210,753 A | * | 5/1993 | Natarajan ................... | 455/452 |
| 5,233,626 A | | 8/1993 | Ames ......................... | 455/12.1 |
| 5,504,938 A | * | 4/1996 | Redden ...................... | 455/12.1 |
| 5,548,294 A | * | 8/1996 | Sturza ........................ | 455/13.1 |
| 5,551,624 A | | 9/1996 | Horstein et al. | |
| 5,646,853 A | * | 7/1997 | Takahashi et al. .......... | 455/456 |
| 5,722,042 A | | 2/1998 | Kimura et al. | |
| 5,736,959 A | * | 4/1998 | Patterson et al. .......... | 455/13.3 |
| 5,822,680 A | * | 10/1998 | Stuart et al. ............... | 455/12.1 |
| 5,825,325 A | * | 10/1998 | O'Donovan et al. ....... | 455/13.1 |
| 5,860,058 A | | 1/1999 | Daniel et al. .............. | 455/12.1 |
| 5,906,337 A | * | 5/1999 | Williams et al. ........... | 455/13.1 |
| 5,915,020 A | * | 6/1999 | Tilford et al. .............. | 455/575 |
| 5,915,217 A | * | 6/1999 | Wiedeman et al. ......... | 455/427 |
| 5,924,014 A | | 7/1999 | Vanden Heuvel et al. . | 455/12.1 |
| 5,925,092 A | * | 7/1999 | Swan et al. ................. | 455/12.1 |
| 6,047,161 A | * | 4/2000 | Sowles et al. .............. | 455/427 |
| 6,160,993 A | * | 12/2000 | Wilson ....................... | 455/12.1 |

* cited by examiner

Primary Examiner—Lester G. Kincaid
(74) Attorney, Agent, or Firm—V. D. Duraiswamy; M. Sales

(57) ABSTRACT

A satellite-based communications system operating at high data rates includes a plurality of satellites each having uplink and downlink antennas for transmitting and receiving a plurality of signal utilizing a plurality of spot beams to and from a plurality of coverage areas at a predetermined range of frequencies. The system also includes a plurality of user terminals for transmitting and receiving signals to and from the plurality of communications satellites at the predetermined range of frequencies and at one of the first plurality of data rates. Each of the user terminals having a steerable antenna for tracking relative movement of each of the user terminals with respect to each of the plurality of communications satellites are for tracking movement of each of the plurality of communications satellites in order to maintain communications with the plurality of communications satellite.

16 Claims, 5 Drawing Sheets

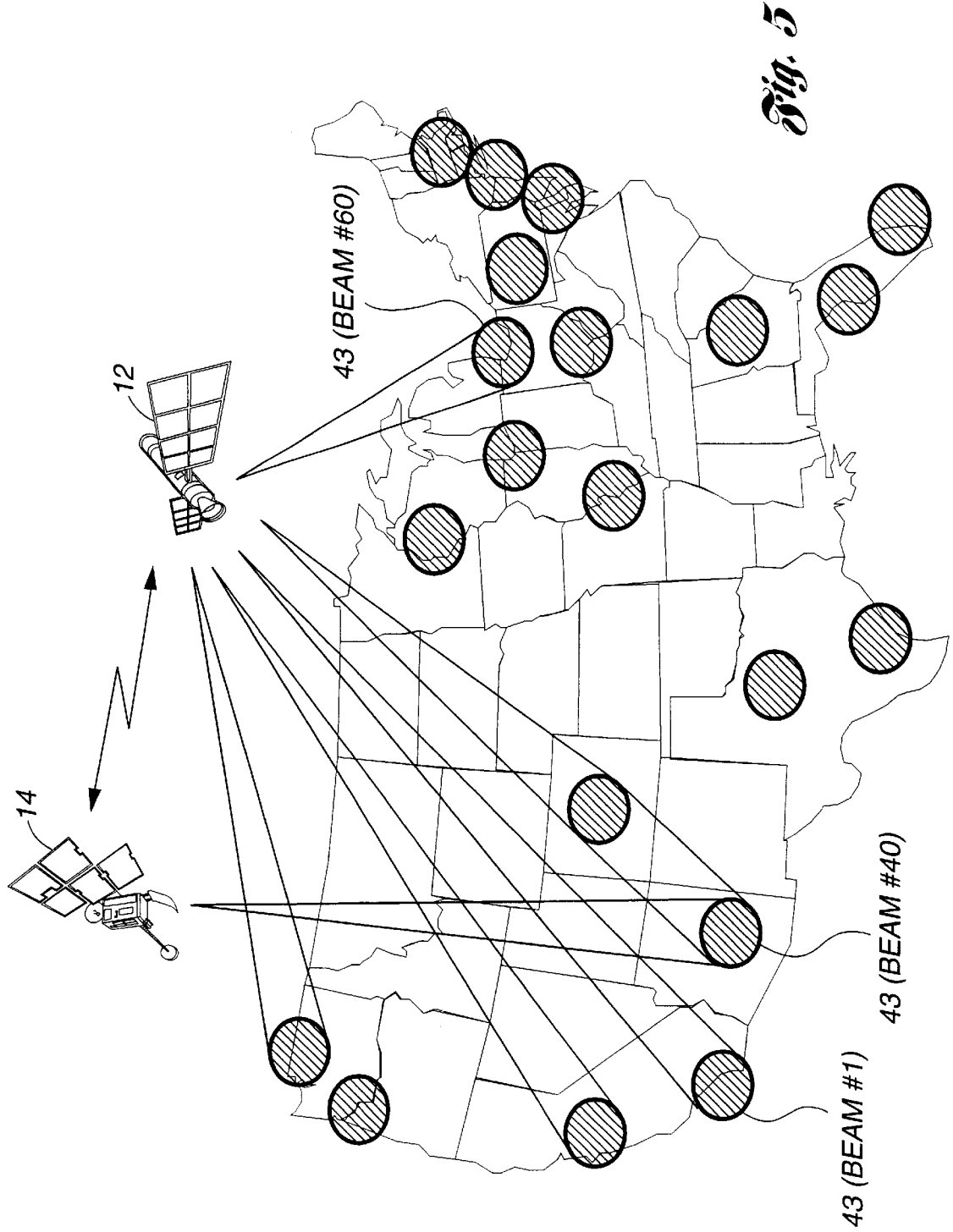

METHOD AND SYSTEM FOR PROVIDING WIDEBAND COMMUNICATIONS TO MOBILE USERS IN A SATELLITE-BASED NETWORK

CROSS-REFERENCE TO RELATED APPLICATIONS

This is a division of parent application filed on Jun. 2, 1997 with Ser. No. 08/867,197.

This invention is related to co-pending application entitled "Method And System For Communicating High Rate Data In A Satellite-Based Communications Network," having the same assignee as the present invention, and which is hereby incorporated by reference.

TECHNICAL FIELD

This invention relates to methods and system for providing wideband communications to mobile users in a satellite-based communications network.

BACKGROUND ART

Wired terrestrial systems offer communications at high data rates, but only while the user is sitting behind a computer. As soon as the user goes to a conference room, walks outside an office building, gets into a car, or drives to a park, the connection is lost Mobility, however, can be supported in one of two ways, terrestrial-based wireless networks or satellite-based communications systems.

Terrestrial-based wireless networks provide voice or data communications between a mobile user and a fixed user or to other mobile users, as well as communications for modem-equipped computers and other similar devices such as mobile facsimile machines. No existing wireless networks have been optimized for a mix of voice, data, and video, despite the trend towards multimedia traffic. Several wireless and wired standards, such as asynchronous transfer mode (ATM), are being designed to optimize multimedia traffic. Wireless wide area networks (WANs) typically carry voice, whereas wireless local area networks (LANs) typically carry data. Most wireless WAN traffic operates at under 19.2 kbps. Wireless LANs that support data rates up to 10 Mbps have begun to appear, but they are limited in range to tens of meters.

A typical terrestrial-based wireless network includes a grid of service zones or cells, with each cell having a base station situated near its center. A mobile user located in a particular cell is connected to that cell's base station through low-power radio frequency (RF) transmissions. Each base station is connected by trunk lines to other gateways, which in turn are connected by trunk lines to various other networks. Each of these cells require costly infrastructure development and cover only a very small area. Placing a wireless base station every 200 m to provide global mobile communications is a very costly and time-consuming endeavor. In addition, the elevation angle between the user and the base station is relatively low for terrestrial-based wireless networks. At high frequencies, obstructions such as trees, buildings, signs, etc. can interfere with communications.

To provide wireless service, satellite-based communications systems have been proposed which would provide world-wide coverage. These proposed systems typically include a constellation of satellites in one orbit only, such as geostationary earth orbit (GEO) only or non-geosynchronous orbit (NGSO) only. Communications satellites in geosynchronous orbit provide coverage in predetermined areas on the earth from the equator. Coverage is typically excluded from the oceans so that satellite capacity is not wasted on non-populated waters. Communications satellites in geosynchronous orbit, however, provide limited coverage at higher or lower latitudes than the equator.

Communications satellites in non-geosynchronous orbit, such as medium earth orbit (MEO) or low earth orbit (LEO), travel relative to the Earth's rotation and typically provide high elevation angle coverage at the higher and lower latitudes, and since they are closer to earth, propagation time delays are minimized. Non-geosynchronous communications satellites, however, waste satellite capacity over the oceans during their orbit and currently do not support wideband service to mobile users.

Data rates up to 19.2 kbps, as available from wireless WANs, will not meet future data rate needs of consumers. For example, many computer users are upgrading their wired modems to 56.6 kbps whenever possible. Such users desire a fast response from their modems even while they are away from their desks. In addition, the nature of the information being transferred is changing from short, text-based electronic mail messages to communications with embedded video clips. Such media-rich messages consume high bandwidth and communications resources, thus requiring high data rates to allow them to be transmitted and received within a reasonable period of time.

Thus, there exists a need for a satellite communications system that provides wideband communications to mobile users. There also exists a need for a satellite communications system that provides global communications service while maximizing the useful capacity of the satellites, reducing the perceived time delay, and maximizing the minimum elevation angle across latitudes.

DISCLOSURE OF THE INVENTION

It is thus a general object of the present invention to provide a wideband satellite communications system providing global wideband network services to mobile users.

In carrying out the above object and other objects, features, and advantages of the present invention, a system is provided for communicating wideband communications to mobile users in a satellite-based network. The system includes a plurality of satellites each having uplink and downlink antennas for transmitting and receiving a plurality of signals utilizing a plurality of spot beams to and from a plurality of coverage areas at a predetermined range of frequencies. Each of the plurality of satellites transmit and receive the plurality of signals at one of a first plurality of data rates. The system further includes a plurality of user terminals for transmitting and receiving signals to and from the plurality of communications satellites at the predetermined range of frequencies and at one of the first plurality of data rates. Each of the user terminals have a steerable antenna for tracking relative movement of each of the user terminals with respect to each of the plurality of communications satellites and for tracking movement of each of the plurality of communications satellites so as to maintain communication with the plurality of communications satellites.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 5 is a schematic illustration of satellite coverage using spot beams.

BEST MODES FOR CARRYING OUT THE INVENTION

Figure 1:
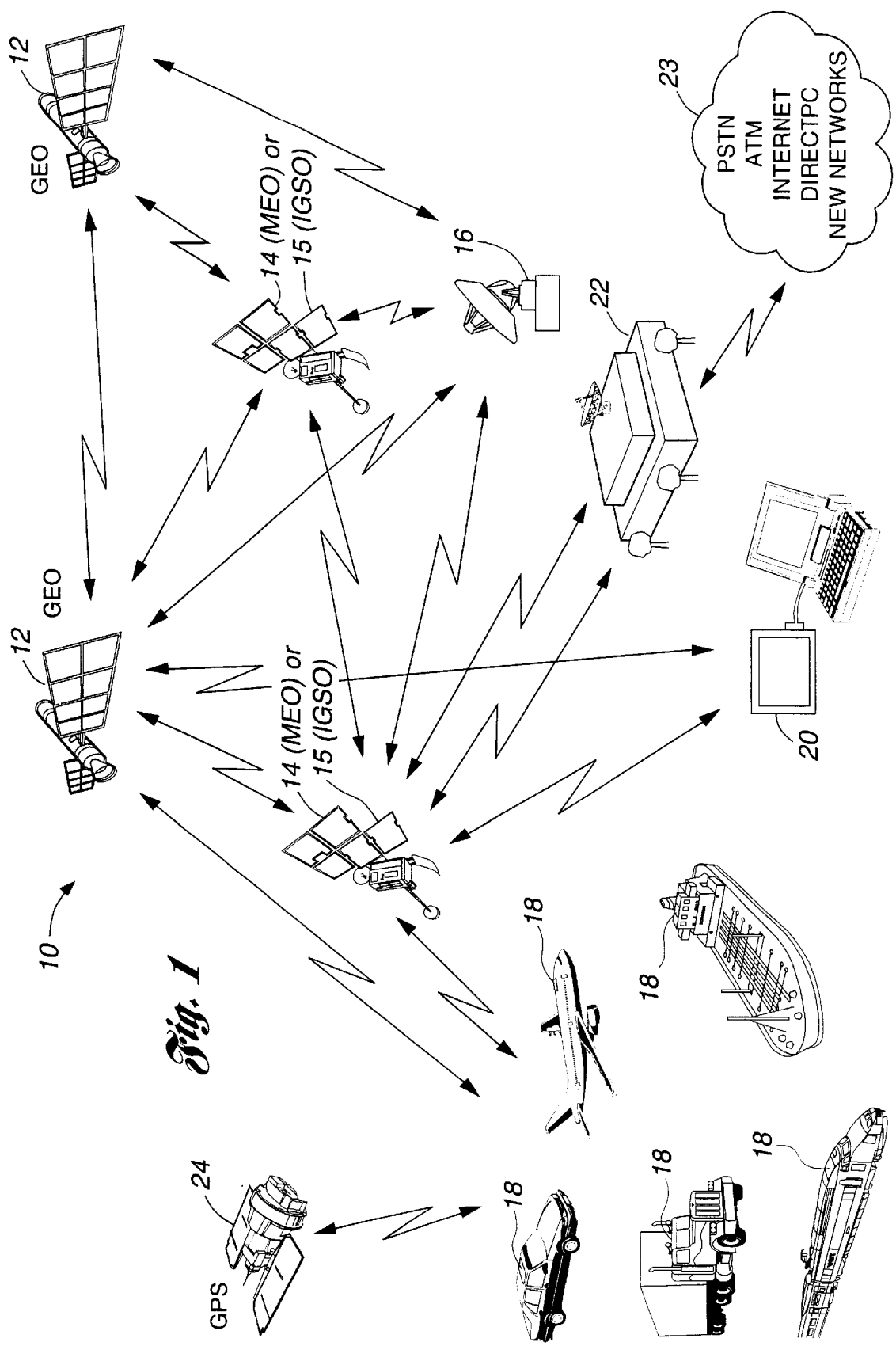
FIG. 1 is a diagrammatic representation illustrating a satellite communications system of the present invention.

Referring first to FIG. 1, a communications system 10 with a typical geometry for practicing the present invention is diagrammatically illustrated. In general, the system 10 includes a plurality of communications satellites in geostationary earth orbit (GEO) 12 and in non-geostationary earth orbit (NGSO) 14, 15 a ground station 16 for controlling and maintaining operation of satellites 12, 14, 15 and user terminals in the form of either mobile devices 18 or portable devices 20. The system 10 also includes a system access node 22 situated in each region serviced by satellites 12, 14, 15 which is connected by trunk lines to one of several possible networks 23, e.g., local or long distance public switched telephone networks (PSTN), Asynchronous Transfer Mode (ATM) networks, the Internet, DirecPC™ (a satellite-based Internet access system), and any other data or voice networks. Still further, the system 10 uses information from at least one GPS satellite 24 to assist in providing positioning information to mobile devices 18.

To provide efficient global coverage, satellites 12, 14, 15 are positioned in two different constellations. The GEO satellites 12 provide quick introduction of regional services, low cost service over selected regions, and greater capacity over high-traffic areas than a NGSO constellation. Preferably, GEO satellites 12 consist of a plurality of satellites in geostationary orbit over high demand regions.

Figure 2:
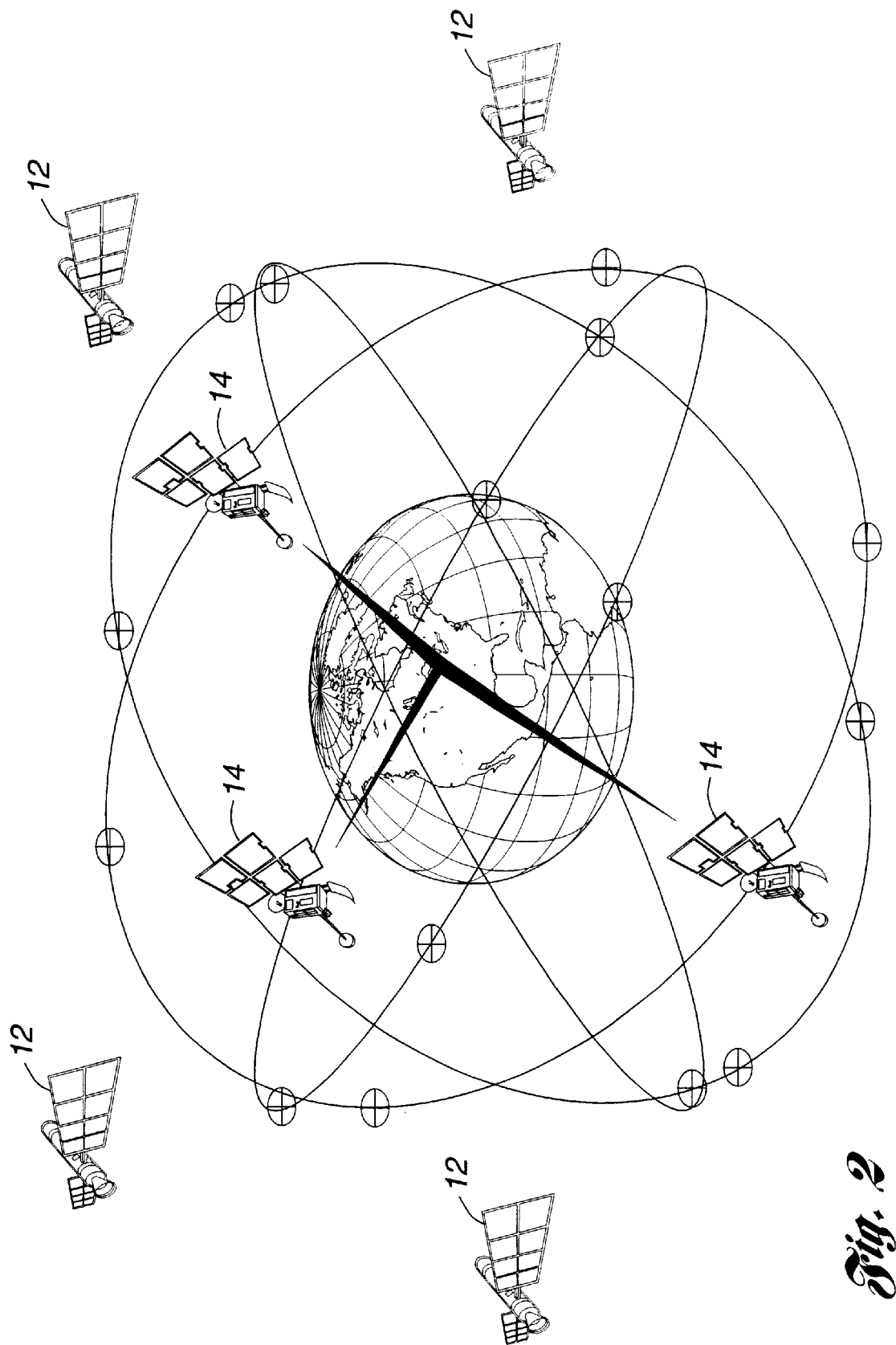
FIG. 2 is a schematic illustration of a GEO/MEO constellation of communications satellites utilized in the present invention.

The NGSO satellites 14, 15 may consist of either medium earth orbit (MEO) satellites 14 or inclined geosynchronous orbit (IGSO) satellites 15. Both MEO and IGSO satellites provide high elevation angle service to higher latitudes, and add satellite diversity to mitigate shadowing effects. MEO satellites 14 reduce latency for highly interactive applications. The roundtrip delay to a MEO satellite 14 at an altitude of 10,352.080 km is approximately 80 ms, which serves interactive, real-time traffic well. The MEO constellation also provides a large overall system capacity at a lower complexity than does a low earth orbit (LEO) constellation. Preferably, the MEO constellation is formed by 4 planes, with 5 satellites per plane, as shown in FIG. 2. Also preferably, the MEO constellation is at an equatorial altitude of 10352 km for a 6-hour orbit that repeats its ground track approximately every twenty-four hours. The repeatable ground track feature simplifies the complexity of the satellite payload, since it only has to store four maps identifying its four different orbit patterns. The repeatable ground track also simplifies the sharing of spectrum with other systems. The satellites in each plane are inclined by 30–60 degrees and have optimized phasing between planes. This constellation allows for over 35 degree elevation to latitudes up to 80 degrees.

The system 10 of the present invention can share the requested frequency spectrum with other satellite and terrestrial constellations through satellite diversity. In the MEO implementation, dual satellite diversity exists at latitudes up to 70 degrees, which permits a user to switch to another satellite in view when the signal from its original satellite degrades due to low elevation angle, shadowing, or interference. Over 50% of the time, the MEO user sees three satellites in the latitudes between 20 and 60 degrees. This satellite diversity also allows increased capacity in a particular geographic location.

Figure 3:
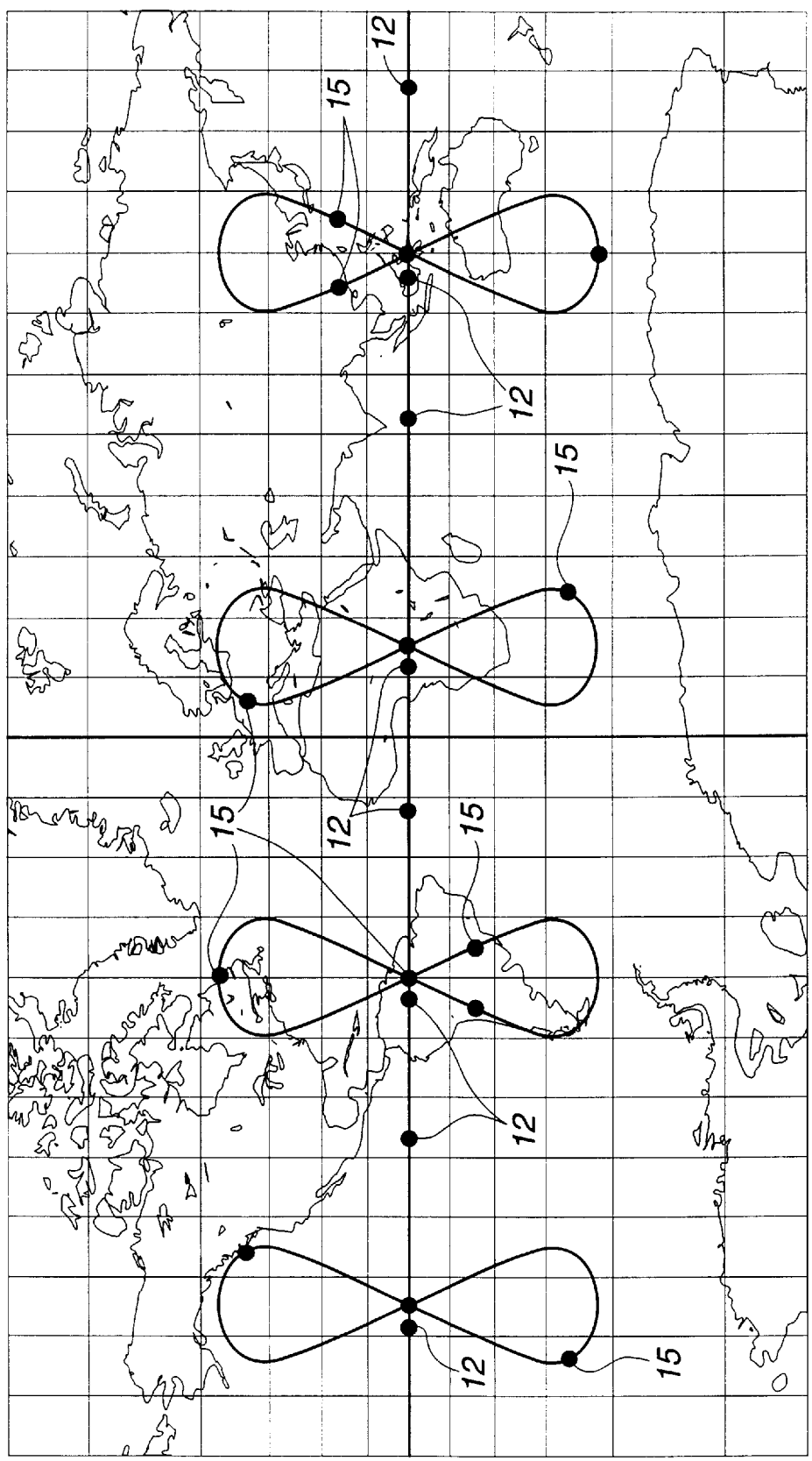
FIG. 3 is a schematic illustration of a GEO/Inclined Geosynchronous Orbit (IGSO) ground track of communications satellites alternatively utilized in the present invention.

IGSO satellites 15 may alternatively be utilized for many of the same reasons an MEO constellation is used, e.g., to provide high elevation angle coverage for higher latitudes than available through GEO satellites, and to minimize the interference with other communication systems operating at the same frequency. Preferably, the IGSO constellation consists of 4 planes of three satellites per plane, phased by 90 degrees between planes at 55 degrees inclination. A ground track of the IGSO satellites 15 is shown in FIG. 3. As shown in FIG. 3, IGSO satellites 15 share an orbit slot with GEO satellites 12. That is, the constellation of IGSO satellites 15 allows the IGSO satellite 15 to pass over an arc of the GEO satellite 12. Scarce frequency spectrum can be shared between GEO satellites 12 and IGSO satellites 15. This configuration also allows an additional satellite, not part of the system 10 of the present invention, to be placed in the same orbit slot and provide service while operating at the same frequency, thereby sharing frequency spectrum.

Figure 4:
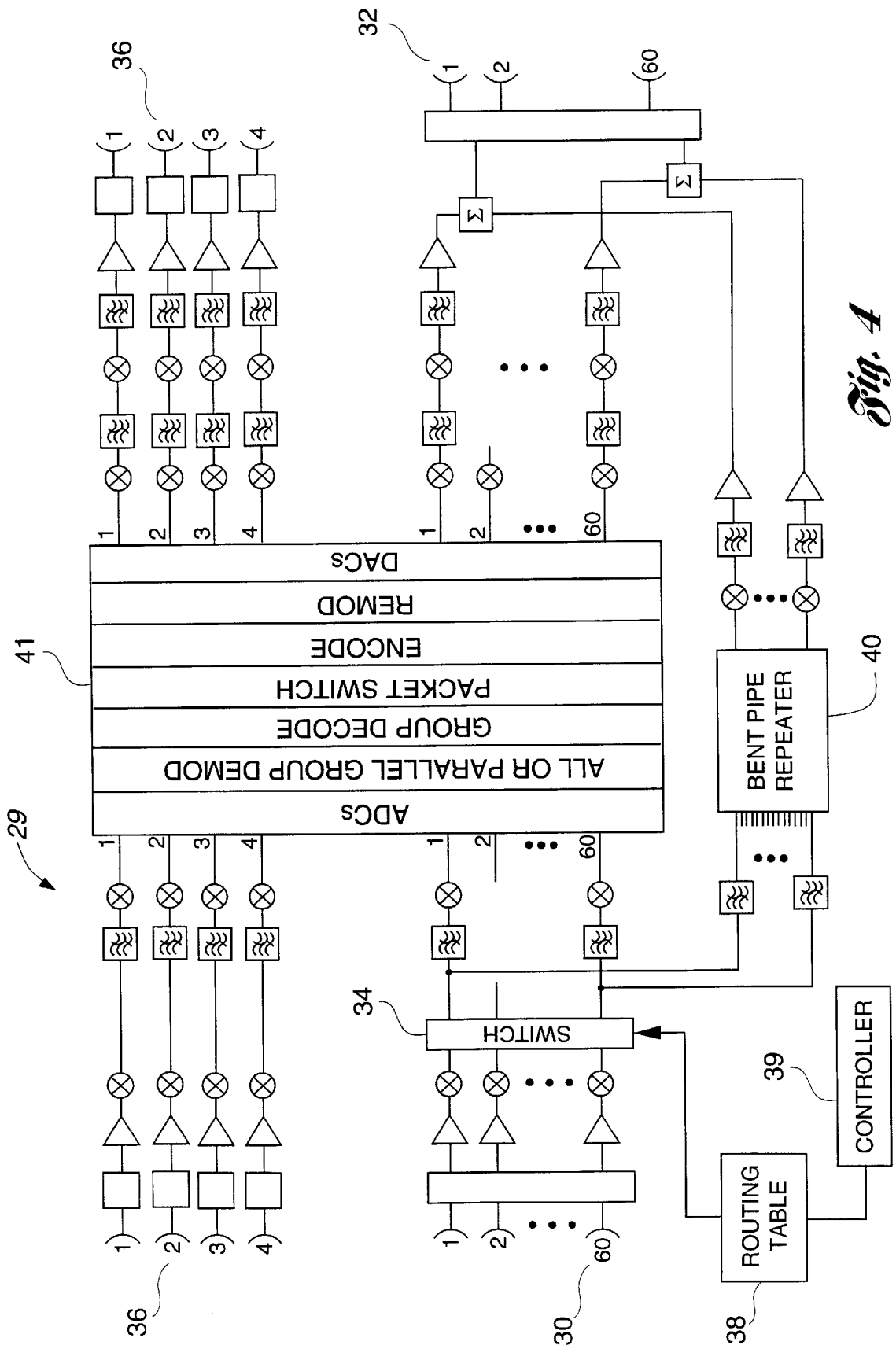
FIG. 4 is a schematic block diagram illustrating a communications subsystem within the satellites of the present invention.

Each of the satellites 12, 14, 15 are preferably high power satellites that use a multi-panel solar array system, along with outboard radiator panels attached to the main body to dissipate heat generated from high powered Traveling Wave Tubes (TWTs). A schematic block diagram illustrating a communications payload 29 within satellites 12, 14, 15 is shown in FIG. 4. Each satellite 12, 14, 15 includes a high frequency uplink antenna array 30, a high frequency downlink antenna array 32, a hybrid switch 34, and an intersatellite link 36. This architecture allows a signal received by one satellite to be transponded directly back to the same beam, switched to another beam, or relayed by intersatellite links through other satellites, forming a global network for the transport of real-time voice and data signals.

Payload 29 operates in a predetermined frequency range, preferably in the 50/40 GHz FSS region (i.e., V-band), or any other similar high frequency range, to provide high capacity service to small user terminals. Data rates up to 2.048 Mbps (equivalent to E1 rate) for portable devices 20 and up to 10 Mbps (equivalent to Ethernet rates) for mobile devices 18 can be supported. Users operating at data rates below the E1 or Ethernet levels can be accommodated by submultiplexing the signals at the user terminal 18.

Uplink antenna array 30 and downlink antenna array 32 receive and transmit spot beams carrying signals at a predetermined range of frequencies. Narrow spot beams allow a greater power to be effectively received and transmitted in the area they cover and enable very small antennas for mobile devices 18. A single satellite antenna can produce many spot beam. Not only do satellites with multiple narrow beam antennas provide a higher radiated power to a covered area, but the same frequency can also be reused several times for different portions of the earth, resulting in more efficient use of scarce frequency allocations.

In the present invention, a surface, or area, such as the Continental United States (CONUS), which receives communications services of the present invention is divided into a plurality of coverage areas 43 as shown in FIG. 5. Uplink and downlink antennas 30, 32, respectively, can support a predetermined number of coverage areas, e.g., 200. However, a subset of the plurality of coverage areas 43 is chosen to be used by uplink and downlink antenna arrays 30, 32, respectively, to support communications services in selected metropolitan areas having heavy traffic. As an example, the Los Angeles area can be served by one high capacity beam, (e.g., Beam 1) while other areas, such as Phoenix and Detroit, are served by other high capacity beams (e.g., Beams 40 and 60). This configuration is controlled by beam selection commands sent by ground station 16. Thus, the spot beams formed by GEO satellites 12 are semi-fixed in position, until reconfigured at a later date. Thus, available satellite resources, such as weight and power, are optimized. The MEO spot beams are reconfigured dynamically as the MEO satellite 14 travels.

Geo satellites 12 preferably transmit the spot beams utilizing a multibeam antenna array. Many small feed horns are positioned so that their signals are reflected in narrow beams by a dish portion of the antenna. For the MEO satellites 14 and the IGSO satellites 15, the spot beams are formed by steerable phased array antennas.

When traffic is received from a source beam that is destined for the same beam, hybrid switch 34 allows the traffic to be sent through bent-pipe repeater 40 down to the same beam with only a carrier frequency translation. Alternatively, the traffic through bentpipe repeater 40 can be routed to one or more hub beams The system access node 22 in the receiving beam receives the information and routes the traffic to its intended destination either through the wired network 23 or back through the satellite. This configuration allows for full flexibility in routing traffic to its ultimate destination, while reducing the satellite switch size, power draw, and mass.

When traffic is received from a source beam that is destined for a different beam, hybrid switch 34 routes the traffic through full digital packet switch 41. Full digital packet switch 41 demodulates incoming packets, reads the headers and decodes the packets, routes the packets to their destination beams, encodes the packets and remodulates the packets. This feature allows direct connections between user terminals 18, 20, as well as bypass of the terrestrial network for other connections. A packet arrangement allows a user to be charged for services based on bit traffic rather than a more expensive interconnect time.

Thus, hybrid switch 34 allows routing from one beam to another and bypasses full digital packet switch 38 for bent-pipe connections to predetermined beams. The system 10 allows controller 39 at the satellite to control real-time traffic on satellites 12, 14, 15 rather than on the ground, so as to reduce transmission delay, congestion and complexity and cost of the total system.

The logic determines whether a signal should be sent through the bent-pipe repeater 40 or through the digital packet switch 41 can be implemented in many ways. One method would be to use special frequency bands for the transmission of bent-pipe traffic. In this method, the user terminal 18, 20 transmits the signal at a specific frequency depending on whether or not signal is to be bent-pipe routed back to the same beam as the source location of the signal, or packet-switched to a different beam. The satellite, detecting traffic on these frequencies, knows to route the traffic through the bent-pipe repeater or to the packet switch via hard-wired connections. Another method would be to use specific time slots for bent-pipe traffic and other time slots for packet-switched traffic. In this method, the table of which time slots are used for bent pipe traffic and which time slots are used for packet-switched traffic would be stored in a routing table 38. This routing table 38 can be updated by commands sent by ground station 16 via a controller 39 onboard the satellite. Thus, the signals can be differentiated at the satellite without the need for demodulation, reducing the satellite switch size, power consumption, and mass.

The user terminal 18,20 can transmit both types of signals; those meant to be bent-piped back to the same beam or packet-switched to a different beam. There are various methods for the user terminal 18, 20 to select which type of signal to transmit. One method is to have the terminal automatically select the type of signal based on the application; local phone calls, for instance, might all be sent as bent-pipe signals, whereas web browsing might automatically use the packet-switched signal to more quickly access distant web servers. Another method is to have the user select whether his connection is to be back to the same beam or to a different beam.

The data rates vary depending upon the user terminal 18, 20 and whether or not rain is present. When there is no rain present, mobile devices 18 support maximum bit rates of 10 Mbps, while portable devices 20 support maximum bit rates of 2 Mbps. The minimum data rate supported is 4 kbps for compressed voice traffic. In heavy rain periods, user terminals 18, 20 fall back to a lower data rate to mitigate the effects of additional signal attenuation caused by rain. In this lower data rate mode, mobile devices 18 support bit rates of up to 2.5 Mbps, while portable devices 20 support bit rates of 500 kbps. These data rates can carry a range of services, including voice, high quality video, image downloads, and internet/intranet browsing. The control of the data rate can be accomplished by one of several possible methods. Preferably, the data rate is controlled on-board the satellite by having the controller 39 detect degraded performance in a given service area 43 and automatically adjust the information data rate. The data rate is adjusted by including more error correction bits in the signal which increases the reliability of the message while reducing the effective data rate.

Because weather conditions are local, a portion of the beam (Beam #1) serving the Los Angeles area might be operating in the clear mode, while another portion of the same beam may be experiencing rain. In order to minimize the impact of lower data rates to the area affected by the rain, the area where lower data rates must be used is localized at any point in time. A user learns of the current data rate through the connection setup procedure. If the weather change during the connection, the satellite controller 39 sends broadcast information packet informing the affected users of the data rate change. User terminals 18, 20 then automatically switch to the lower data rate.

Intersatellite links 36 are included so that traffic from one satellite covering a particular region or selected metropolitan areas can be linked to a second satellite covering the same or other areas and regions. Intersatellite line 36 also permits seamless handoffs of traffic as one NGSO satellite leaves a region and another enters. Intersatellite link 36 may be an optical (or laser) link operating in the 1.6 micron region via two 9 inch laser-telescope assemblies 71, 73 Alternatively, intersatellite link 36 may be a radio frequency (RF) link operating in the 60 GHz region.

As discussed above, each of the satellites 12, 14, 15 are also in communication with ground station 16. Ground station 16 has two functions. A satellite control function manages the health and status of all the satellites 12, 14, 15 and maintains their orbits. A network operations control function provides resource management, fault management, accounting and billing information. Ground station 16 is preferably placed in low-rain regions of the world so as to provide line-of-sight communications with each of the satellites 12, 14, 15.

The system 10 further includes mobile devices 18 or portable devices 20. Mobile devices 18 provide safety, productivity and entertainment services to mobile vehicles, such as cars, trucks, airplanes, trains or boats. Utilizing GPS 24, tracking information and location-dependent services can be provided to mobile device 18. Mobile device 18 is preferably a conformal. tracking phased array antenna mounted to the roof of the mobile vehicle so as to maintain communication with each of satellites 12, 14, 15 even though mobile device 18 is in motion. Mobile device 18 is preferably 50 cm×50 cm.

Portable devices 20 allow a user to stay connected to a variety of services anywhere in the world. Portable device 20 is a notebook-sized devices, preferably no larger than 20 cm×30 cm in size, that is configured to be connected to a variety of electronic devices which would otherwise use a wired modem connection. As with mobile devices 18, portable devices 20 includes a tracking antenna, such as an electronic phased-array antenna, to communicate with any of the satellites 12, 14, 15.

System access node 22 of the present invention provides end users a transparent connection to terrestrial networks 23. System access node 22 includes an antenna, such as a fixed parabolic antenna or a mechanically steered or phased array antenna, to communicate with each of the satellites 12, 14, 15. System access node 22 demodulates the received signals, and routes the traffic through the terrestrial network 23 to their ultimate destinations. By providing a global communications mesh, and by interfacing to existing terrestrial networks, the system 10 of the present invention will be an integral and defining part of the Global Information Infrastructure (GII), and part of the U.S. National Information Infrastructure (NII).

The satellite communications system of the present invention serves the increasing number of people on-the-go who desire voice and high data-rate, interactive data connections from anywhere. Using either the portable or mobile device, users are able to stay connected to a variety of networks such as the internet, wide and local area networks, home and office computers ATM networks, and the terrestrial phone system.

In one possible implementation, the capacity to a mobile user 18 is 9.75 Gbps per GEO satellite 12 and 5.12 Gbps per MEO satellite 14. The MEO constellation can support up to 102 Gbps worldwide. With a total of 28 satellites in both MEO 14 and GEO 12, the total mobile system capacity jumps up to 190 Gbps worldwide. The network is capable of supporting a wide variety of data rates, ranging from 4 kbps for compressed voice traffic up to 10 Mbps for Ethernet speeds. The number of users at each data rate will vary, and the corresponding total number of users that the network can support will vary accordingly.

The system 10 of the present invention can include, or be combined with, other systems to enable increased capacity over high-population areas and ubiquitous coverage over lower-population areas and to provide a backup connection at a lower frequency to maintain the communications link in rain conditions. This can be accomplished by having the other systems transmit a wide area beam surrounding the narrow spot beams to provide service to the remote areas not covered by the spot beams. The data rates in these areas, however, would typically be lower than the data rates of the present invention.

While the best modes for carrying out the invention have been described in detail, those familiar with the art to which this invention relates will recognize various alternative designs and embodiments for practicing the invention as defined by the following claims.

What is claimed is:

1. A global wideband satellite-based communications system, comprising:
   a plurality of GEO satellites in a geostationary earth orbit constellation, and
   a plurality of MEO satellites in a medium earth orbit,
   each one of said GEO satellites having at least two intersatellite links, a first link for communicating with one of said plurality of MEO satellites and a second link for communicating with another one of said GEO satellites, and
   each one of said GEO and MEO satellites having uplink and downlink antennas for receiving and transmitting signals from and to earth, a full digital packet switch, a bent-pipe repeater, and a hybrid switch, controlled by said controller, for routing traffic from one beam that is destined for another beam through said full digital packet switch bypassing said bent-pipe repeater.

2. The system of claim 1 having eight GEO satellites and twenty MEO satellites.

3. The system of claim 1, wherein said plurality of MEO satellites are deployed so that dual satellite diversity exists at latitudes up to 70 degrees.

4. The system of claim 1, wherein said plurality of MEO satellites are deployed so that triple satellite diversity exists at latitudes between 20 and 60 degrees.

5. The system of claim 1, wherein said plurality of MEO satellites are deployed in four planes with five satellites in each plane.

6. The system of claim 1, wherein said antennas of said GEO satellites are multibeam antenna arrays capable of generating spot beams.

7. The system of claim 6 wherein said multibeam antenna arrays, in response to beam selection commands sent by a ground station generate spot beams that are semi-fixed in position over selected areas until reconfigured.

8. The system of claim 1, wherein said antennas of said MEO satellites are steerable phased array antennas capable of generating spot beams.

9. The system of claim 1 wherein each satellite further includes a controller for controlling real-time traffic on each satellite.

10. The system of claim 1 further including a routing table which is controlled by commands sent from said controller for determining whether a signal should be sent through said bent-pipe repeater or through said digital packet switch.

11. A global wideband satellite-based communications system, comprising:
    a plurality of GEO satellites in a geostationary earth orbit constellation, and
    a plurality of IGSO satellites in inclined geosynchronous orbit,
    each one of said GEO satellites having at least two intersatellite links, a first link for communicating with one of said plurality of IGSO satellites and a second link for communicating with another one of said GEO satellites, and
    each one of said GEO and IGSO satellites having uplink and downlink antennas for receiving and transmitting signals from and to earth, a full digital packet switch; a bent-pipe repeater, and a hybrid switch, controlled by said controller, for routing traffic from one beam that is destined for another beam through said full digital packet switch bypassing said bent-pipe repeater.

12. The system of claim 11, wherein said antennas of said GEO satellites are multibeam antenna arrays capable of generating spot beams.

13. The system of claim 12 wherein said multibeam antenna arrays, in response to beam selection commands sent by a ground station, generate spot beams that are semi-fixed in position over selected areas until reconfigured.

14. The system of claim 11, wherein said antennas of said IGSO satellites are steerable phased array antennas capable of generating spot beams.

15. The system of claim 11 wherein each satellite further includes a controller for controlling real-time traffic on each satellite.

16. The system of claim 11 further including a routing table which is controlled by commands sent fron said controller for determining whether a signal should be sent through said bent-pipe repeater or through said digital packet switch.

* * * * *